US011345646B2

(12) United States Patent
Truong et al.

(10) Patent No.: US 11,345,646 B2
(45) Date of Patent: May 31, 2022

(54) MINERAL ORGANIC FERTILIZERS COMPOSITION AND PROCESS OF MANUFACTURING THE SAME

(71) Applicant: Hanh Te Truong, Ho Chi Minh (VN)

(72) Inventors: Hanh Te Truong, Ho Chi Minh (VN); Duyen My Tran, Ho Chi Minh (VN)

(73) Assignee: HANH TE TRUONG, Ho Chi Minh (VN)

( * ) Notice: Subject to any disclaimer, the term of this patent is extended or adjusted under 35 U.S.C. 154(b) by 0 days.

(21) Appl. No.: 17/403,866

(22) Filed: Aug. 16, 2021

(65) Prior Publication Data

US 2022/0055962 A1  Feb. 24, 2022

(51) Int. Cl.
| | |
|---|---|
| C05G 1/00 | (2006.01) |
| C05D 9/02 | (2006.01) |
| C05F 11/02 | (2006.01) |
| C05F 17/60 | (2020.01) |
| C05F 3/00 | (2006.01) |
| C05G 5/20 | (2020.01) |
| C05G 5/23 | (2020.01) |
| C05G 5/40 | (2020.01) |
| C05F 17/40 | (2020.01) |
| C05F 5/00 | (2006.01) |

(52) U.S. Cl.
CPC ............... *C05G 1/00* (2013.01); *C05D 9/02* (2013.01); *C05F 3/00* (2013.01); *C05F 5/002* (2013.01); *C05F 11/02* (2013.01); *C05F 17/40* (2020.01); *C05F 17/60* (2020.01); *C05G 5/20* (2020.02); *C05G 5/23* (2020.02); *C05G 5/40* (2020.02)

(58) Field of Classification Search
None
See application file for complete search history.

(56) References Cited

FOREIGN PATENT DOCUMENTS

| | | | | | |
|---|---|---|---|---|---|
| CN | 103145463 B | * | 6/2014 | ............... | C05F 15/00 |
| CN | 105622277 A | * | 6/2016 | ............... | C05G 3/00 |
| CN | 106376314 A | * | 2/2017 | ............... | C05B 1/02 |
| CN | 106966650 A | * | 7/2017 | ............... | C05G 1/00 |
| CN | 108358728 A | * | 8/2018 | ............... | C05F 11/00 |

* cited by examiner

*Primary Examiner* — Wayne A Langel

(57) ABSTRACT

A mineral organic fertilizer composition obtained by a process comprising the following steps performed homogeneously mix having a specific predetermined percentage (%) by weight relative to the total weight of the mineral organic fertilizer composition, specifically homogeneously mix a coal slag composition, the micronutrient solution with the manure composition to form a homogeneous mixture, in which, the homogeneous mixture is added with microbiological composition; composting the homogeneous mixture to form a foundation mixture; homogeneously mix the foundation mixture with the different mixing components comprising an NPK fertilizer and a mixture of micronutrient solutions and microbiological composition having a predetermined percentage (%) weight, and then drying or centrifuged.

3 Claims, 3 Drawing Sheets

MINERAL ORGANIC FERTILIZERS COMPOSITION AND PROCESS OF MANUFACTURING THE SAME

FIELD OF THE INVENTION

The present invention relates generally to the treatment of environmental pollution, fertilizers, and plant physiology. More specifically, the present invention relates to the process for creating organic mineral fertilizers synthesized from manure, preferably cow processed manure with relative humidity below 40%, or a mixture of manure and organic residues combined with dry coal slag, Micronutrients solution, and NPK fertilizer.

BACKGROUND ART

Chemical fertilizers are one of the four important factors in agricultural production. However, the fertilizer use efficiency is still very low, the amount of fertilizer lost during the use process is huge, causing waste and affecting the natural environment. In an effort to improve the efficiency of fertilizers, people have used many ways to produce new fertilizers. The term New Generation Fertilizer (or Next Generation Fertilizer) is increasingly widely used by researchers and manufacturers. However, up to now, there is not a complete concept of new generation fertilizers, but only one general criterion for this type of fertilizer is stated: New generation fertilizers will increase efficiency and increase productivity in production Agriculture while conserving natural resources and protecting the environment.

One of the solutions for new generation fertilizers is to add auxiliary substances which can be: auxiliary substances (wetting agent, binder, evenly distributed agent, absorbent auxiliary, v.v); growth stimulants and regulators; humic acid; amino acids; biological stimulants; extracts of seaweed, algae; substitutes for complex or organic compounds; physical form (crystal, suspension, v.v). In particular, recently, Chitosan and Oligochitosan have been used quite a lot to produce multi-functional fertilizers (effective to limit pests and diseases). In addition, scientists also put into the fertilizer product a multi-function intermediate element, which is the element silicon (Si). The role and effects of silicon are shown as follows: strengthening the immune system for the plant, helping the plant to grow fast and healthy; strengthen the plant's resistance against harmful insects such as worms, aphids, and mildew, increase crop yield.

According to VN Patent No. 2-0001712, the invention belongs to the new generation fertilizer group derived from agricultural by-products, with classification index C05F. In which, the invention refers to the process of producing organic fertilizers from agricultural—industrial residues derived from plants using beneficial microorganisms. However, this process requires additional primary and secondary propagation time in order to create the microbiological composition provided at the compositing stage of the organic fertilizer manufacturing process. In addition, the cultivation of microbiological composition needs to be done by a knowledgeable person, and investing in equipment leads to increased production costs. Furthermore, the invention reveals the use of peat supplementation to increase the N, P, and K compositions of organic fertilizers. However, peat increases the compositing stage time for a long time because in peat there are bitumen compounds that are difficult to dissolve and are toxic to plants.

According to VN Patent No. 2-0000956, the invention has C05F classification index. In which, the invention refers to a microbiological composition for decomposing straw and the process of treating straw into organic fertilizers by using this product. The advantages of the invention shorten the cost and time of composting and reduce environmental pollution when treating post-harvest straw by burning. However, the collection of straw to build compost pile up still has many limitations, particularly difficult to apply to areas where labor is scarce. However, in rice-growing areas such as the Mekong River Delta and the Red River Delta, most of them use a combined reaper instead of hand reaping and rice spools at home. This leads to the phenomenon that after harvest straw is spread evenly over the field, making it difficult to collect this straw to make a compost pile.

According to Patent No. CN103145463B, the invention refers to a method of producing organic fertilizers from animal manure, supplemented with microbiological composition and compounds from agricultural by-products. However, the double composting period of the invention increases energy costs and extends the production time.

Therefore, it is necessary to have a process of creating synthetic mineral organic fertilizers that provide adequate nutrients for plants, increase the absorption of minerals, limit minerals leaching during flooding, or evaporation during drought. At the same time, it helps the soil to maintain the balance of environment and moisture, saving costs, and production time.

Furthermore, what is needed to have a process of creating synthetic mineral organic fertilizers using pure manure, and additional microbiological composition increases the nutritional value of the fertilizer. At the same time contribute to reducing environmental pollution, microbiological balance, and provides humus, limits soil leaching, and erosion.

Otherwise, what is needed to have a process of creating synthetic mineral organic fertilizers obtained from the above process having useful properties and effects that contribute to reducing the use of chemical fertilizers, increase the quality of agricultural products, soil fertility conservation, reducing pollution of agricultural land, groundwater sources and the river systems.

Finally, what is needed to create mineral organic fertilizer composition contain complex bonds between coal slag, mineral, and humus acid whose activation energy is close to that of the corresponding chemical bonds to form stable structural colloidal particles. Therefore, when fertilizing the soil, these bonds continue to grow with inorganic and organic molecules of the soil-forming colloidal humus particles capable of slowly secreting minerals, providing enough for the needs of and limit plant poisoning.

SUMMARY OF THE INVENTION

Accordingly, an objective of the present invention is to provide a mineral organic fertilizer composition comprising:
 a manure composition, in which the best manure composition is cow processed manure with a relative moisture content of less than 40% or a mixture consisting of manure and organic waste of the first percentage (%) by weight;
 a coal slag composition of the second percentage (%) by weight;
 a micronutrient solution of the third percentage (%) by weight, an NPK fertilizer of the fourth percentage (%) by weight;
 a mixture of micronutrient solutions and microbiological composition of the fifth percentage (%) by weight;

where, the percentage (%) by weight is determined by the total from the first percentage (%) to the fifth percentage (%) is 100% the mineral organic fertilizer composition.

Another objective of the present invention is to provide a mineral organic fertilizer composition including a macronutrient component having 15%-17% by weight; a micronutrient component having 0.01%-0.03% of weight; a component of organic matter (humic acid, fulvic acid, and other organic matter) having 21%-23% by weight; a microbiological component having 0.005%-0.015% by weight; a component Aluminosilicate and others impurities component having 25%-27% by weight.

Yet another objective of the present invention is to provide a simple and cost-effective implementation method for creating the mineral organic fertilizer composition including:

create a homogeneous mixture by mixing the manure composition with at least one or two components consisting of a coal slag composition and a micronutrient solution, in which a homogeneous mixture is added microbiological composition;

create a foundation mixture by composting the homogeneous mixture at a temperature of 45° C.-60° C. for 25-30 days;

create a temporary mixture by mixing the foundation mixture with an NPK fertilizer or a mixture of micronutrient solutions and microbiological composition of a predetermined percentage (%) of weight;

drying or centrifuged the temporary mixture to creat (create) the mineral organic fertilizer composition.

In view of the foregoing, another objective of the present invention is to contribute to the reuse of inorganic waste fuels which is coal slag as a catalyst for the resolution process, and humus the organic matter of cow processed manure during the compositing period. At the same time, it provides more micronutrients for plants and helps soil keep the balance of environment and moisture.

Finally, the purpose of the invention is to contribute to environmental protection, to ensure safety for human and animal health. At the same time, animal manure and other organic wastes can be used as raw materials for the creation of the mineral organic fertilizer composition to improve the soil, increase porosity, moisture retention, and soil fertility.

These and other advantages of the present invention will no doubt become obvious to those of ordinary skill in the art after having read the following detailed description of the preferred embodiments, which are illustrated in the various drawing Figures.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 1:
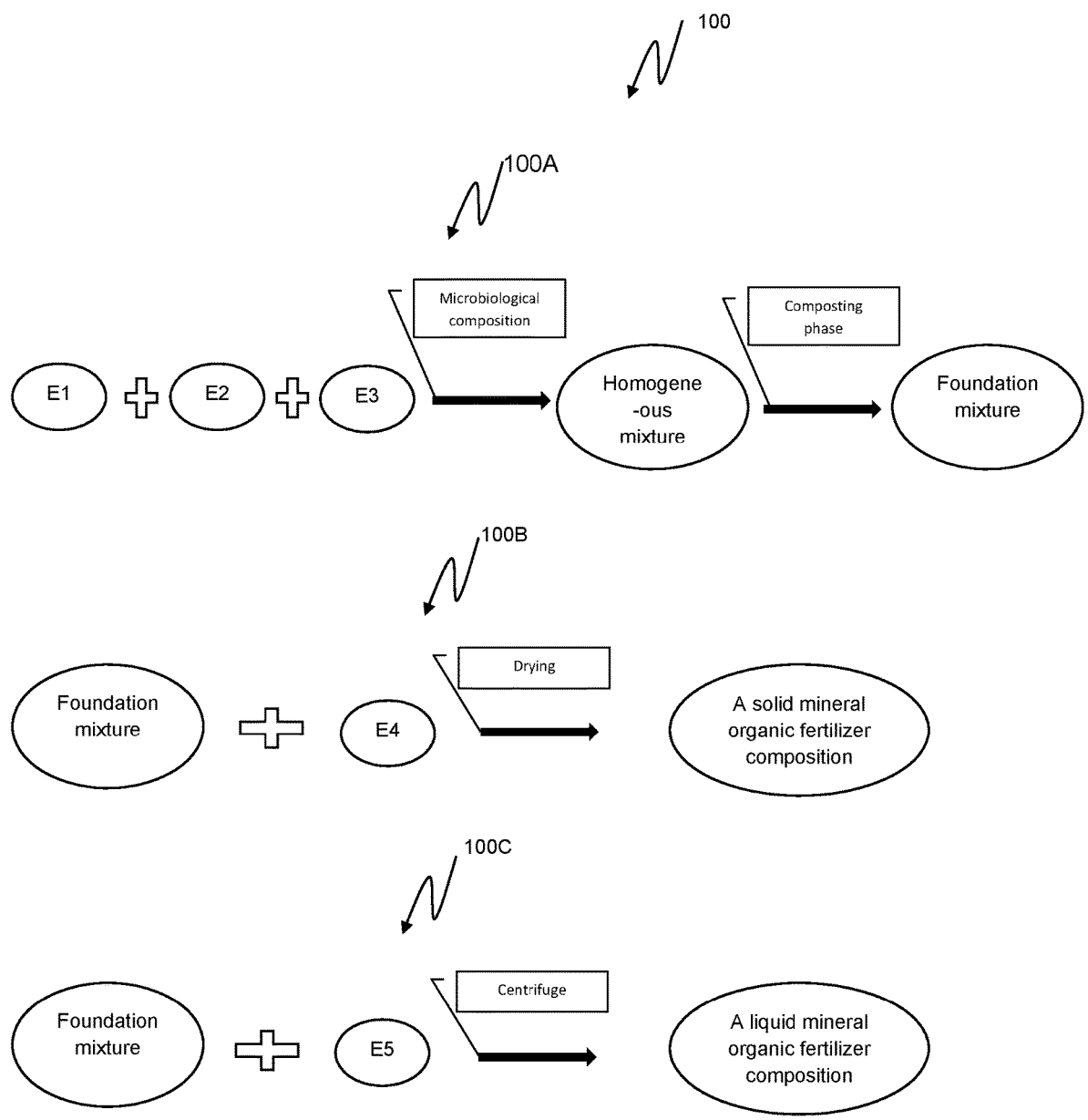
FIG. 1 is a conceptual block diagram illustrating the principle of creating the mineral organic fertilizer composition in accordance with an exemplary embodiment of the present invention.

One embodiment of the invention is now described with reference to FIG. 1. FIG. 1 illustrates a conceptual block diagram of method 100 including a first stage 100A and a second stage 100B or a third stage 100C of manufacturing the mineral organic fertilizer composition in the solid or liquid state for the purpose of the manufacturer.

In the first 100A stage, a manure composition, in which the best manure composition is cow processed manure with a relative moisture content of less than 40% or a mixture consisting of manure and organic waste E1 that is characteristic of providing organic nutrients, macronutrient, and micronutrient. E1 mixed with at least one or two components that has the effect of enhancing nutritional resources and adsorption capacity including E2 and E3 that creates a homogeneous mixture, in which a homogeneous mixture adding the microbiological composition of a predetermined percentage (%). In many aspects of the invention, the homogeneous mixture is defined as a mixture with the following functions: (1) increasing nutrient source and adsorption capacity by forming the slow secreting organic complex structure of E1; (2) a catalyst for the resolution process, and humus process the organic matter contained in E1; (3) acts as a reactant involved in the resolution process, and humus process. In other words, without the homogeneous mixture, it is impossible to undergo the composting phase to create the foundation mixture, so the mineral organic fertilizer composition will not be formed.

Within the scope of the present invention, the term "foundation mixture" includes the following meanings.

(a) foundation mixture is the product obtained when and only if the homogeneous mixture has undergone a composting phase, and foundation mixture also including three main components humic acids, fulvic acids and humic compounds and some undissolved organic matter;

(b) the components contained in the foundation mixture are evenly distributed when mixed with component E4 or a mixture E5 having a percentage (%) of the weight;

(c) the components contained in the foundation mixture are chemically bonded with the components E4 or mixed with E5 as a chemical reaction to form a new chemical composition.

Still with FIG. 1, referring now to a second stage 100B or 100C, performing the second stage 100B or third stage 100C mixing phase depends on the intent of the manufacturer wanting to produce a solid or liquid mineral organic fertilizer composition. The second stage 100B applies to a solid mineral organic fertilizer composition (powder/granule/pellet) when the foundation mixture is mixed with an E4, and performs the drying process. The component includes nitrogen, phosphorus, and potassium; wherein each type component of E4 has percent (%) of predetermined weight compared with the total weight of mineral organic fertilizer composition. The third stage 100C applies to liquid mineral organic fertilizer composition when the foundation mixture is mixed with an E5 mixture, and performs the centrifuge process. The component of E5 mixture including component micronutrient solutions and microbiological composition; wherein each type component of E5 has percent (%) of predetermined weight compared with the total weight of mineral organic fertilizer composition. It should be noted that the chemical bonds formed between the components of the foundation mixture and the mentioned mixing components are not limited to any kind of reaction to form a new chemical composition.

In the present invention, the mineral organic fertilizer composition is obtained by a process consisting of the formation of a foundation mixture by mixing component E1 with at least one or two components E2 and E3 and performing the composting phase having to add microbiological composition; the foundation mixture mixing with the component E4 or E5 mixture with the percentage (%) of the predetermined weight compared to the total weight of the mineral organic fertilizer composition; in which the mixing order E2, E3, and microbiological composition with E1 do not stipulate the specific mixing order.

Figure 2:
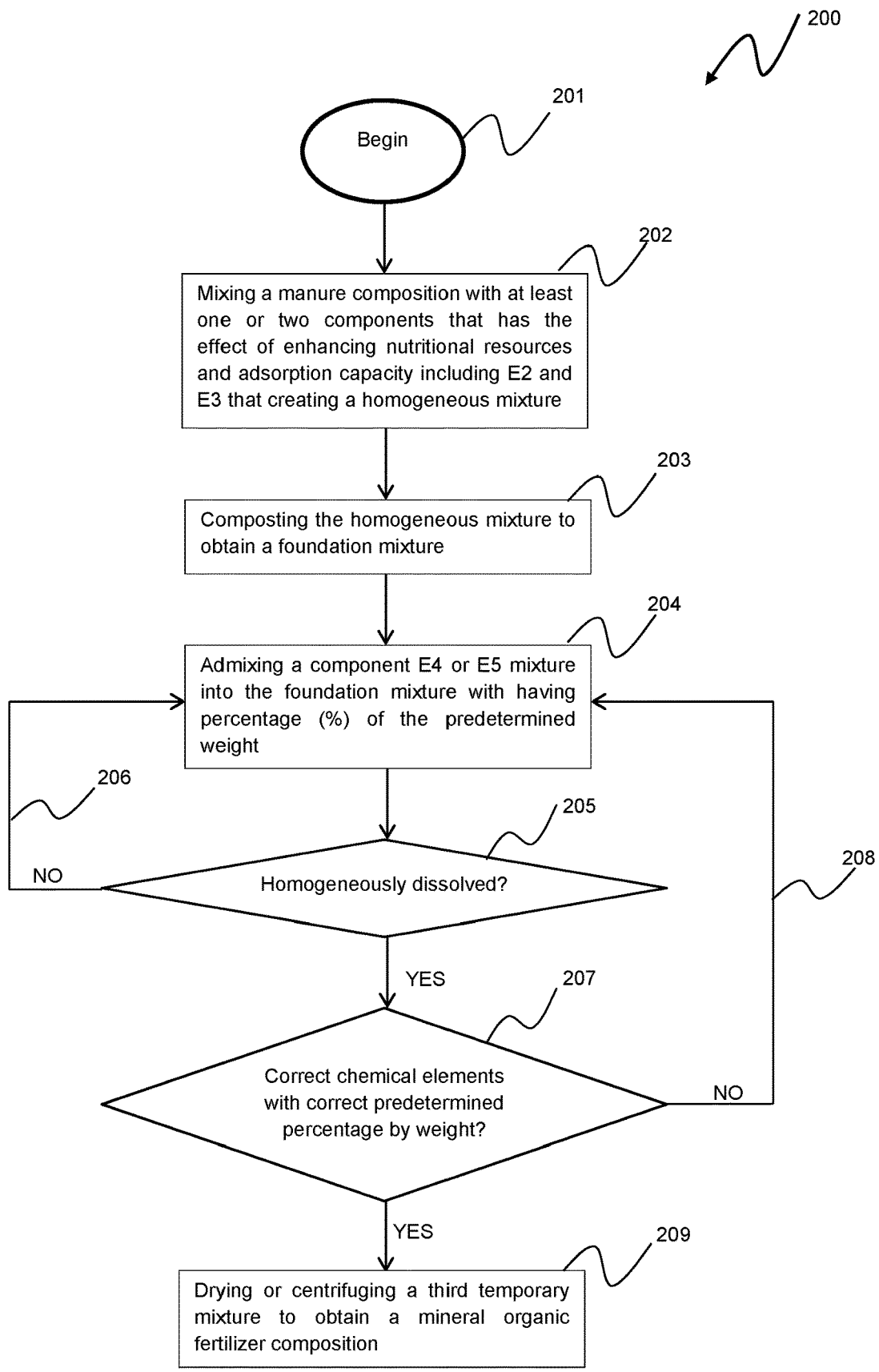
FIG. 2 is a flowchart of a general method of manufacturing the mineral organic fertilizer composition in accordance with an exemplary embodiment of the present invention.

Referring to FIG. 2, the method of manufacturing the mineral organic fertilizer composition 200 ("method 200") based on the above principle in accordance with an exemplary embodiment of the present invention. In particular, method 200 includes the following steps:

Step 201, all the raw materials from E1 to E5, and the manure composition E1 are carefully prepared and stored in separate instruments. The manure is obtained from a variety of animal sources, preferably cow processed manure with a relative moisture content of less than 40% or a mixture consisting of manure and organic waste.

Step 202, the manure composition E1 is mixed with at least one or two components that have the effect of enhancing nutritional resources and adsorption capacity including E2 and E3 that creating a homogeneous mixture; in which a homogeneous mixture adding the microbiological composition of a predetermined percentage (%). As mentioned above, the best manure composition is cow processed manure with moisture below 40%; and mix at least one or two mixing components of coal slag composition E2 slag and micronutrient solution E3. It should be noted that the mixing order E2, E3, and microbiological composition with E1 do not stipulate the specific mixing order. Step 202 is performed by a mixing equipment, the mixing equipment has been known in previous art so the description of the structure and its operating principle will not be described in detail in the invention.

Step 203, create a foundation mixture by performing the homogeneous mixture composting phase, in which the composting phase consists of two main processes: humus process and mineralization process with a specified time and temperature, with a combination of stirring and spraying surface water.

Step 204, the foundation mixture is mixed with different components of E4 or E5, wherein each component having a predetermined percentage (%) of the total weight of the mineral organic fertilizer composition. According to the embodiment of the present invention, the mixing component consists of an NPK fertilizer (E4) or a mixture of micronutrient solution and microbiological composition (E5), carefully selected and mixed with the foundation mixture. The mixing components added to the foundation mixture would dictate the solid/liquid state of the mineral organic fertilizer composition of the final product listed in Table 3 and Table 4 below.

Step 205, the foundation mixture is mixed with the mixing components of E4 or E5 each having a predetermined percentage (%) by weight to obtain the mineral organic fertilizer composition of the present invention. In one exemplary embodiment of the present invention, E4 or E5 are carefully selected and admixed with the foundation mixture. Components of E4 or E5 are listed in Table 2 below and will be discussed later. Yet in another exemplary embodiment of the present invention, depending on the foundation mixture is admixed with component E4 or E5 to create the final product will have the chemical components listed in Table 4 below.

At step 206, if the mixing components are not evenly distributed uniformly in the temporary mixture, step 204 is repeated using the mixing equipment including the millers, grinding mixers, and sieves until homogeneous conditions are reached.

At step 207, each time the mixing components are mixed with the foundation mixture, the resulting temporary mixture is checked for the correct predetermined chemical compositions as a percentage (%) by weight. Percent mass or percentage (%) by weight=(mass of solute/mass of solution)×100%. The unit of mass is usually grams. Mass percent is also known as the correct percentage by weight or w/w %. It should also be noted that the molar mass is also within the meaning of the invention. Molar mass is the total mass of all atoms in a mole of compound. Total all volume percentages add up to 100%. Step 207 can be done by mass spectrometers and other similar devices.

Step 208, if the mixing component is found and/or does not have the correct predetermined percentage (%) by weight then step 204 is repeated until the correct predetermined percentage (%) by weight is achieved.

Finally, step 209, drying or centrifuge a third temporary mixture and other supporting stages creating a mineral organic fertilizer composition. In which, the term of the "third temporary mixture" is described according to the present invention meaning that the mixture reaches double the state "YES" in step 205 and step 207.

Figure 3:
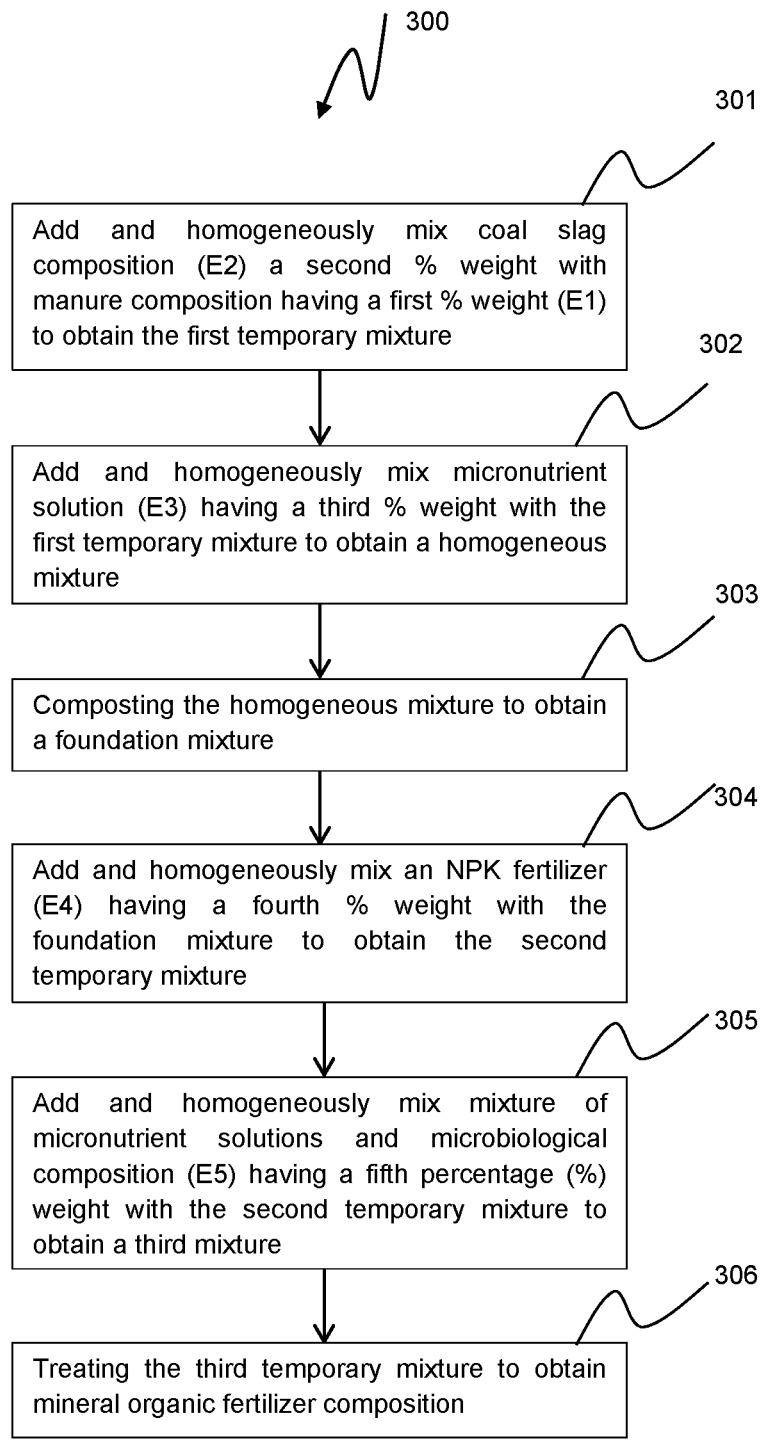
FIG. 3 is a flowchart illustrating a specific process of manufacturing the mineral organic fertilizer composition in accordance with an exemplary embodiment of the present invention. The second stage 100B applies to a solid mineral organic fertilizer composition (powder/granule/pellet) when the foundation mixture is mixed with an E4 component including nitrogen, phosphorus, and potassium, wherein each type component of E4 has percent (%) of predetermined weight compared with the total weight of mineral organic fertilizer composition.

Referring to FIG. 3, flowchart 300 is a process of manufacturing mineral organic fertilizer composition ("process 300") in accordance with an exemplary embodiment of the present invention.

Step 301, manure having a first predetermined percentage (%) by weight is mixed with a coal slag composition having a second predetermined percentage (%) by weight to obtain a first temporary mixture. The best-used manure composition (E1) is cow processed manure with a relative moisture content of less than 40% or a mixture of manure and organic waste. Manure composition (E1) contains the following chemical components: cellulose, hemicellulose, protein, and breakdown products such as lipids, organic acids, inorganic substances, etc listed in Table 1 below. In manure, there is always a relatively simple solution of water-soluble substances such as urea, uric acid, and inorganic salts of K, Na, Ca, etc. Cow processed manure is one of the primary components involved in process 300.

TABLE 1

Percentage (%) of substances contained in dry cow manure

| Organic matter | Macronutrients | | | | Relative moisture | Micro-nutrients and impurities composition |
|---|---|---|---|---|---|---|
| | N | $P_2O_5$ | $K_2O$ | Other Macro-nutrients | | |
| 50% | 0.3% | 0.2% | 0.9% | 1.5% | 40% | 7.1% |

In an exemplary embodiment of the present invention, all two formulations of the mineral organic fertilizer composition are comprised of 45% by weight of manure composition, wherein the best-used manure composition is cow processed manure with a relative moisture content of less than 40% or a mixture of manure and organic waste. In different aspects of the present invention, it is possible to replace manure composition with a mixture of manure and other organic wastes such as bagasse, sawdust or chopped straw, water hyacinth, peat, etc. Wherein the ratio of manure and organic waste is 1:1 that means instead of using 45% manure composition replaced with 22.5% organic waste and 22.5% manure.

Coal slag (E2) is added to catalyze the humus process and mineralization process, increasing the mineral adsorption capacity of manure composition (E1). Coal slag (E2) is the waste produced by coal burning. Usually, coal slag accounts consist of 15% to 20% by weight of the coal. Due to being oxidized at high temperatures, most of the nonmetallic oxides are evaporated, leaving mainly metal oxides such as $SiO_2$, $Al_2O_3$, $Fe_2O_3$, CaO, $MnO_2$, etc . . . . Total of these oxides accounts for over 70% by weight of the coal slag. These oxides are catalysts for the humus process and mineralization process of the organic matter of manure during the composting phase that provide additional micronutrients for plants and support the soil to maintain a balance of environment and moisture. In addition, these oxides combine with organic matter, macronutrients, and micronutrients to form a slow secreting organic complex structure that increases mineral adsorption capacity, limiting mineral leaching when flooding or evaporation during a drought. The metal oxides in coal flag with the symbol $M_xO_y$ have a very strongly polar covalent bond between metal M and an oxygen atom (O) since the outermost electron layer of oxygen is six, in which two electrons are used to bonded to metal, the remaining four electrons are bonded to the two shared bonding electrons that are deflected towards the oxygen atom. It is these bonded that the metal oxides in coal slag have strong adsorption in two ways: physical adsorption and chemical adsorption. This adsorption initiates heterogeneous catalytic reactions to decompose organic matter in manure. According to the invention, both formulations of mineral organic fertilizer composition are 35% by weight of coal slag composition.

At step 302, a micronutrient solution (E3) having a third predetermined percentage (%) by weight is added to the above first temporary mixture to obtain a homogeneous mixture as described above. Wherein, the microbiological composition is added to the homogeneous mixture to prepare the composting phase in step 303.

Within the scope of the present invention, the term "homogeneous mixture" includes the following meanings:
(a) a homogeneous mixture evenly distribute of manure components, coal slag composition, and micronutrient solution having a predetermined percentage (%) by weight;
(b) homogeneous mixture is a mixture that provides a full range of nutritional component also known as a basic substrate component that qualifies for the performance of the composting phase (composting process);
(c) a homogeneous mixture including components is ground to accounts comprised of 0.05 mm to 0.15 mm, preferably 0.1 mm;
(d) homogeneous mixtures directly involved in reactions such as elimination reactions, cracking reactions, covalent reactions, substituent reactions, closed loop reactions, cyclic reactions, ionic reaction, ionic reaction, and redox reaction to obtain the foundation mixture;
(e) homogeneous mixtures acting as reactants when combined with additional microbiological composition joined for humus process and mineralization process at step 303 are discussed later. In other words, without the homogeneous mixture, it is impossible to perform the composting phase at step 303, so mineral organic fertilizer composition will not be created.

Within the scope of the present invention, the term "homogeneous" includes the following meaning that is the even distribution of the different components in the same solution or mixture.

In the present invention, the component for the preparation of micronutrient solution includes a multi-metallic ore containing most of the chemical elements that exist in the form of single substance, alloys, and compounds. Using chemicals solution to catalyze redox reactions to separate micronutrients from polymeric concentrates by dilute $HNO_3$ solution, concentrated $HNO_3$ solution, dilute $H_2SO_4$ solution, concentrated $H_2SO_4$ solution, $NH_4OH$ solution and other similar chemicals solution. The multi-metallic ore that is immersed (extracted) n times (n is a positive integer) with the above mentioned chemical solutions to obtain micronutrients that exist as nitrate salts and chloride salts based on their reactivity. Then neutralize to a pH value from 7 to 8 and proceed to dilute according to a predetermined amount of water to obtain micronutrient solution. In an exemplary embodiment of the present invention, the first formulation of the mineral organic fertilizer composition comprises 10% by weight of micronutrient solution. In another exemplary embodiment of the present invention, the second formula of the mineral organic fertilizer composition comprises 0% by weight of micronutrient solution.

At step 303, carry out the corn positing of the homogeneous mixture at 45° C.-60° C. for 25-30 days to obtain the foundation mixture as described above. Composting is a necessary measure that both uses relatively high temperatures in the decomposition of organic matter to destroy weeds and germs of insects and plant diseases and promote the decomposition of organic matter. In addition, it also speeds up the mineralization process so that when applied to the soil the organic fertilizer can quickly provide nutrients to the plant. Composting reduces manure weight but increases manure quality. The final product of composting is an organic fertilizer called compost which includes hummus, a portion of undissolved organic matter, mineral salts, intermediate products of decomposition, some enzymes, stimulants, and many saprophytic microorganisms. In the tropical climate in our country with high humidity, high sun, relatively high temperature, the decomposition of organic matter takes place relatively quickly. Thus using semi-compost manure is the best, because long-term compost takes up a lot of nitrogen. The quality and quantity of the compost vary widely depending on the time and method of composting. The time and method of composting affect the composition and activity of the microorganisms that decompose and convert organic matter into humus, thereby affecting the quality of compost.

For the embodiment of the invention, use composting pits or plastic pots covered with pineapple sacks. For composting pits dug after 0.5 m deep, 3 m×3 m square, fill the hole with 0.5 m high on the average ground; the volume of each pit is 9 m³ and the compositing capacity is 9 tons. After filling the pit with manure, adding a thin layer of wet clay, plug in the vent pipe, and cover the canvas. At the same time, it is necessary to regularly add water to keep the humidity at about percentage of 70%, creating an environment for strong aerobic microorganisms to increase the temperature to about 55° C.-60° C. To ensure the proper functioning of microorganisms, the manure pile should be kept loose, porous, and airways.

After filling the pit with manure, adding a thin layer of wet clay, plug in the vent pipe, and cover the canvas. At the same time, it is necessary to regularly add water to keep the humidity at about a percentage of 70% creating an environment for strong aerobic microorganisms to increase the temperature to about 55° C.-60° C. To ensure the proper functioning of microorganisms, the manure pile should be kept loose, porous, and airways.

In addition, in the composting stage, there are two main transformation processes: mineralization process and humus process. Mineralization is the process of decomposition of organic matter into simple mineral compounds, the final product of which is soluble and gas compounds. For complex chemical compounds are the basic components of manure: nitrogen, carbohydrates, lipids, tannins, etc., are influenced by enzymes secreted by microorganisms in the manure combined with the heterogeneous catalysts of coal slag, air oxygen, and water which are hydrolyzed to produce products having simpler structures such as double sugars, single sugar, fatty acids, glycerin, polyphenol, etc. by the action of redox, demineralization, etc. reduction of carboxyl.

Products of this stage are further converted to volatile organic acids, unsaturated acids, Aldehyde, alcohols, phenol redox products, quinol. In the aerobic case, the above intermediate products are completely transformed into products: $M_3PO_4$, $M_2SO_4$, $MNO_2$, $MNO_3$, $NH_3$, $H_2O$, $CO_2$ (where M is $Ca^{2+}$, $Mg^{2+}$, $K^+$, $Na^+$, $NH4^+$). The rate of mineralization depends on pH, humidity, and temperature. The mineralization process requires airway and water, but if the humidity is too high causes inhibition of microorganism activities. In the conditions of 70% humidity, pH comprises 6.5 to 7.5, compositing temperature comprises 45° C. to 60° C. is suitable for microbiological activities and promotes strong mineralization.

These polymeric compounds bond by polymerization to obtain polymeric humus compounds. Humus component having mainly humic acid stimulates seed germination and promotes seedling growth; stimulates the formation and development of roots; increases shoot growth; increases the weight of stems, roots, and leaves; increases crop yield. In addition, humus also has the ability to exchange cation and has the ability to adsorb soil pollutants by complexing with heavy metals.

According to the invention, the complex bonds between coal slag, mineral nutrients and humus acid with activation energy are nearly equal to the corresponding chemical bonds to create colloidal particles with stable spatial structure. When fertilizing the soil, these bonds continue to grow with the inorganic and organic molecules of the soil converting the soil into colloidal humus particles. It is this structure of the soil that prevents minerals from being washed away by flooding and evaporating in drought. The greatest effect of this structure is the ability to slowly release minerals, providing just enough for the needs of plants. Plants that want to absorb minerals need to consume similar activation energy, so they adsorb only those nutrients with the required amount equivalent to the amount of carbohydrates that plants synthesize during photosynthesis. Furthermore, plants also get other macronutrients, micronutrients with sufficient quantities needed. Without the mechanism of slow secreting organic complexes, the minerals and other toxic components in the soil will be passively absorbed by the plants by the inequality osmosis mechanism through the cell membrane, leading to excess minerals in the tissues and if the amount is large enough will cause plant poisoning. The excess mineral nutrients such as nitrate ions, nitrite from nitrogen; mercury, phosphorus, sulfur compounds; substances with azo or nitrazo family from pesticides and herbicides, not only reduce the flavor and aroma of agricultural products but also turn agricultural products into risks of causing human diseases, especially diseases related to endocrine disorders such as heart disease, cancer, blood pressure, diabetes, gut, brain stroke, etc. However, if the period of drought or flooding is prolonged, this structure will gradually be broken and mineral loss occurs.

In step 304, the NPK fertilizer (E4) component having the fourth predetermined percentage (%) by weight was mixed homogeneously in the foundation mixture at step 303 to obtain a second temporary mixture. Components of NPK fertilizer (E4) include element N (nitrogen), element phosphorus (P) and element potassium (K) supplementing macronutrients for mineral organic fertilizer composition. In an exemplary embodiment of the present invention, the first formula of mineral organic fertilizer composition is comprised of 10% by weight of NPK fertilizer, of which the N (nitrogen) having predetermined percentage 5% by weight of NPK fertilizer, the P (phosphorus) having predetermined percentage 4% by weight of NPK fertilizer and the K (potassium) having predetermined percentage 1% by weight of NPK fertilizer. In another exemplary embodiment of the present invention, the second formula of mineral organic fertilizer composition comprises 0% by weight of NPK fertilizer.

In step 305, the mixture of micronutrient solution and microbiological composition (E5) having the fifth percentage (%) by weight was mixed homogeneously in the second temporary mixture at step 304 to obtain a third temporary mixture. According to the embodiment of the invention, In an exemplary embodiment of the present invention, the first formula of mineral organic fertilizer composition comprises 0% by weight of the mixture of micronutrient solution and microbiological composition. In another exemplary embodiment of the present invention, the second formula of mineral organic fertilizer composition is 10% by weight of the mixture of micronutrient solution and microbiological composition.

In step 306, treating the third temporary mixture in step 305 to obtain mineral organic fertilizer composition. In an exemplary embodiment of the present invention, the third temporary mixture of the first formula at step 305 was adjusted for pH, humidity, and shaped to obtain a solid form mineral organic fertilizer composition (powder/granule/tablet). Wherein adjust the pH of the mixture to neutral by using powdered lime and adjust the relative humidity to 20% to 30% by heating methods such as drying. Shape by pressing pellets according to the particle size of about 2 mm. Then do the packing, specifically pouring quantitatively solid mineral organic fertilizer composition into the packaging and sealing the eyelids. In another exemplary embodiment of the present invention, the third temporary mixture of the first formula at step 305 was centrifuged to obtain a liquid mineral organic fertilizer composition. Then do the packing, specifically pouring quantitatively liquid mineral organic fertilizer composition into the packaging and closing the lid.

All mixing components (E1-E5) and their predetermined percentage (%) by weight are listed below in two different formulations in Table 2.

TABLE 2

Mixing components of mineral organic fertilizer composition

| Ref. No. | Name of mixing components | Percentage (%) Formulation | |
|---|---|---|---|
| | | First formulation | Second formulation |
| E1 | Manure composition, in which the best manure composition is cow processed manure with a relative moisture content of less than 40% or a mixture consisting of manure and organic waste | 45 | 45 |
| E2 | Coal slag composition | 35 | 35 |
| E3 | Micronutrient solution | 10 | 0 |
| E4 | NPK fertilizer (5% N; 4% P; 1% K) | 10 | 0 |
| E5 | Mixture of micronutrient solutions and microbiological composition | 0 | 10 |

Note:
The homogeneous mixture is added 0.01% by weight of microbiological composition.

After process 300 is performed in the specific order indicated above, the mineral organic fertilizer composition includes the chemical components listed in Tables 3 and 4 below.

TABLE 3

Medicinal Chemical Components of the Solid Mineral Organic Fertilizer Composition.

| No. | Name of Medicinal Components | W/W (%) |
|---|---|---|
| 1 | Macronutrient | 15-17 |
| 2 | Micronutrient | 0.01-0.03 |
| 3 | Organic matter (humic acid, fulvic acid, and other organic matter) | 21-23 |
| 4 | Microbiological | 0.005-0.015 |
| 5 | Aluminosilicate and others impurities | 25-27 |
| 6 | Water | rest |

TABLE 4

Chemical composition of 1 kilogram of Solid Mineral Organic Fertilizer Composition and Chemical composition of 1 liter of Liquid Mineral Organic Fertilizer Composition.

| Name of Medicinal Components | W/W (%) | |
|---|---|---|
| | Solid | Liquid |
| Organic matter | 23 | 0.2084 |
| Ion Cl$^-$ | 1.9 | 0.0800 |

TABLE 4-continued

Chemical composition of 1 kilogram of Solid Mineral Organic Fertilizer Composition and Chemical composition of 1 liter of Liquid Mineral Organic Fertilizer Composition.

| Name of Medicinal Components | W/W (%) | |
|---|---|---|
| | Solid | Liquid |
| Total Nitrogen-calculation | 2.1430 | 0.2423 |
| Total Keldjhahl Nitrogen | 19317 | 0.1850 |
| Nitrite ($NO_2^-$) | 0.0038 | 0.00011 |
| Nitrate ($NO_3^-$) | 0.2075 | 0.0572 |
| Silver (Ag) | <0.0002 | <0.0002 |
| Aluminum (Al) | 0.5295 | <0.0005 |
| Arsenic (As) | <0.0005 | <0.0005 |
| Boron (B) | 0.0033 | <0.0005 |
| Barium (Ba) | 0.0049 | <0.0002 |
| Beryllium (Be) | <0.0002 | <0.0002 |
| Calcium (Ca) | 4.1089 | 0.0055 |
| Cadmium (Cd) | <0.0002 | <0.0002 |
| Cobalt (Co) | 0.0003 | <0.0002 |
| Chromium (Cr) | 0.0013 | <0.0002 |
| Copper (Cu) | 0.0106 | <0.0002 |
| Iron (Fe) | 0.7178 | 0.0003 |
| Potassium (K) | 2.8649 | 0.1375 |
| Lithium (Li) | 0.0007 | <0.0002 |
| Magnesium (Mg) | 0.5748 | 0.0121 |
| Manganese (Mn) | 0.0927 | <0.0002 |
| Molybdenum (Mo) | 0.0003 | <0.0002 |
| Sodium (Na) | 0.2139 | 0.0458 |
| Nikel (Ni) | 0.0008 | <0.0002 |
| Phosphorus (P) | 1.5670 | 0.0005 |
| Lead (Pb) | 0.0009 | <0.0005 |
| Sulfur (S) | 1.5323 | 0.0603 |
| Selenium (Se) | <0.0005 | <0.0005 |
| Tin (Sn) | <0.0005 | <0.0005 |
| Strontium (Sr) | 0.0100 | <0.0002 |
| Titanium (Ti) | 0.0045 | <0.0002 |
| Vanadium (V) | 0.0009 | <0.0002 |
| Zinic (Zn) | 0.0278 | <0.0005 |

In an exemplary embodiment of the present invention, mineral organic fertilizer composition obtained from method 200 and process 300 are used to basal fertilize or top-dressing all crops. According to nutrient equivalence calculation, 1 kg of fertilizer is used to harvest 1 kg of crop product in the form of a fruit and applies to high economic value crops such as coffee, pepper, mangosteen, oranges, grapefruit, durian, custard, apple, etc.

The purpose of the following example is to prove that the technical solution in this invention has been successfully researched and tested by the author. Specifically, according to the process 300 applied to create 10 kg of solid mineral organic fertilizer composition including the following specific steps.

a) create a homogeneous mixture by mixing 3.5 kg of finely ground dry honeycomb coal slag and 1 liter of the micronutrient solution with 4.5 kg of cow manure and mixing until homogeneous has a particle size of about 0.1 mm;

b) compositing the homogeneous mixture at step a) in a plastic container covered with a pineapple sack at 45-60° C. for 30 days, and at the same time spray more frequently to keep the humidity around 70%. The result of the compositing phase obtained the foundation mixture;

c) mixing foundation mixture at step b) with NPK fertilizer; in which, NPK fertilizer includes 0.5 kg N+0.4 kg P+0.1 kg K;

d) drying, adjusting pH, and shaping the mixture at step d) until it has a particle size of about 2 mm, the relative humidity is about 25%. The result is a solid mineral-mechanical degradation product (powder/granule/pellet).

According to another embodiment of the invention, mineral organic fertilizer composition has been experimentally carried out grafted hybrids have a fruit or will bear fruit after 3-6 months such as oranges, tangerines, guava, star fruit, and apple. The amount of fertilizer for trees in one crop is divided into three parts: basal fertilizing two parts and fertilizing when the rest flowering. In it, when mixing loose soil with manure at the ratio of 5:1, put in pots and then put seedlings. If the soil in pots is covered with plastic, it must be removed, and covered with dry leaves above the ground to keep humidity. The fertilizer dosage used depends on the age of the plant and choose a reasonable pot size (if any).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A process of manufacturing the mineral organic fertilizer composition comprising steps performed in the following specific orders:
   (i) creating a first temporary mixture by mixing 35% by weight a coal slag composition with 45% by weight a manure composition;
   wherein said the manure composition including a variety of animal manure is selected from cow manure having relative humidity below 40%, or a mixture of manure and organic waste having ratio 1:1 including 22.5% by weight of an organic waste and 22.5% by weight of the animal manure;
   wherein said the organic waste including bagasse, sawdust, water hyacinth, peat;
   (ii) creating a homogeneous mixture by mixing 10% by weight a micronutrient solution with the first temporary mixture in step i);
   wherein said the micronutrient solution obtained by extracting a multi-metallic ore is immersed n times (n is a positive integer) in $HNO_3$ solution, concentrated $HNO_3$ solution, dilute $H_2SO_4$ solution, concentrated $H_2SO_4$ solution, then neutralize at pH 7-8 and proceed to dilute by water;
   wherein 0.01% by weight of a microbiological composition is added to the homogeneous mixture, in which the microbiological composition is ground to accounts comprised of 0.05 mm to 0.15 mm;
   (iii) composting the homogeneous mixture in step ii) at 45° C. 60° C. for 25-30 days by composting pits or plastic pots covered with pineapple sacks to create a foundation mixture;
   wherein the composting pits dug having 0.5 m deep, 3 m×3 m square, fill the composting pits with 0.5 m high on the average ground; the volume of each composting pit is 9 $m^3$ and the compositing capacity is 9 tons; after filling the composting pit, adding a thin layer of wet clay, plug in the vent pipe, cover the canvas; and keeping a humidity 70% at pH 6.5-7.5;
   (iv) creating a second temporary mixture by mixing 10% by weight of NPK fertilizer composition with the foundation mixture in step iii);
   wherein the NPK fertilizer composition including N (nitrogen) having 5% by weight, P (phosphorus) having 4% by weight, and K (potassium) having 1% by weight;
   v) adjusting pH and humidity of the second temporary mixture in step iv), then shaping/centrifuging and packing to create a mineral organic fertilizer composition:
   wherein said adjusting the pH to neutral by adding powdered lime;
   wherein said adjusting the humidity to 20% to 30% by drying;
   wherein, when shaping (powder/granule/pellet) having size 2 mm, the composition in solid form;
   wherein, when centrifuging, the composition in liquid form.

2. The process of claim 1, wherein the manure composition, the coal slag composition, the micronutrient solution, and the NPK fertilizer, all are transformed by the process from step (i) to step (v) that yields chemical components of the composition in solid form consisting of an elemental silver (Ag) having less than 0.0002% by weight; an elemental aluminum (Al) having 0.5259% by weight; an elemental arsenic (As) having less than 0.0005% by weight; an elemental Boron (B) having 0.0033% by weight; an elemental Barium (Ba) having 0.0049% by weight; an elemental Beryllium (Be) having less than 0.0002% by weight; an elemental Calcium (Ca) having 4.1089% by weight; an elemental cadmium (Cd) having less than 0.0002% by weight; an elemental cobalt (Co) having 0.0003% by weight; an elemental chromium (Cr) having 0.0013% by weight; an elemental Copper (Cu) having 0.0106% by weight; an elemental Iron (Fe) having 0.7178% by weight; an elemental Potassium (K) having 2.649% by weight; an elemental lithium (Li) having 0.0007% weight; an elemental magnesium (Mg) having 0.5748% by weight; an element Manganese (Mn) having 0.0927% by weight; an elemental Molybdenum (Mo) having 0.0003% by weight; an elemental sodium (Na) having 0.2139% by weight; an elemental nickel (Ni) having 0.0008% weight; an elemental Phosphorus (P) having 1.5670% by weight; an elemental Lead (Pb) having 0.0009% by weight; an elemental Sulfur (S) having 1.5323% by weight; an elemental selenium (Se) having less than 0.0005% by weight; an elemental Tin (Sn) having less than 0.0005% by weight; an elemental Strontium (Sr) having 0.01% by weight; an elemental Titan (Ti) having 0.0045% weight; an elemental of vanadium (V) having 0.0009% by weight; an elemental Zinc (Zn) having 0.0278% by weight; organic matter having 23% by weight; Chlorine ion ($Cl^-$) having 1.9% by weight; Nitrite ($NO_2^-$) having 0.0038% by weight; and Nitrate ($NO_3^-$) having 0.2075% by weight.

3. The process of claim 1, wherein the manure composition, the coal slag composition, the micronutrient solution, and the NPK fertilizer, all are transformed by the process from step (i) to step (v) that yields chemical components of the composition in liquid form consisting of an elemental silver (Ag) is less than 0.0002% by weight; an elemental aluminum (Al) less than 0.0005% by weight; an elemental arsenic (As) is less than 0.0005% by weight; an elemental Boron (B) is less than 0.0005% by weight; an elemental barium (Ba) is less than 0.0002% by weight; an elemental Beryllium (Be) is less than 0.0002% by weight; an elemental Calcium (Ca) having 0.0055% by weight; an elemental cadmium (Cd) is less than 0.0002% by weight; an elemental Cobalt (Co) is less than 0.0002% by weight; an elemental chromium (Cr) is less than 0.0002% by weight; an elemental Copper (Cu) is less than 0.0002% by weight; an elemental Iron (Fe) having 0.0003% by weight; an elemental Potassium (K) having 0.137% by weight; an elemental lithium (Li) is less than 0.0002% by weight; an elemental magnesium (Mg) having 0.01% by weight; an element Manganese (Mn) is less than 0.0002% by weight; an elemental molybdenum (Mo) is less than 0.0002% by weight; an elemental sodium (Na) having 0.0458% by weight; an elemental of Nickel (Ni) is less than 0.0002% by weight; an elemental Phosphorus (P) having 0.0005% by weight; an elemental of Lead (Pb) is less than 0.0005% by weight; an elemental Sulfur (S) having 0.0603% by weight; an elemental selenium (Se) is less than 0.0005% by weight; an elemental Tin (Sn) is less than 0.0005% by weight; an elemental Strontium (Sr) is less than 0.0002% by weight; an elemental Titan (Ti) is less than 0.0002% by weight; an elemental vanadium (V) is less than 0.0002% by weight; an elemental Zinc (Zn) is less than 0.0005% by weight; organic matter having 0.2084% by weight; chloride ion ($Cl^-$) having 0.08% by weight; Nitrite ($NO_2^-$) having 0.00011% by weight; and Nitrate ($NO_3^-$) having 0.0572% by weight.

* * * * *